United States Patent
Polk, Jr.

(10) Patent No.: US 6,671,974 B2
(45) Date of Patent: Jan. 6, 2004

(54) LINE GUIDE

(76) Inventor: Vess E. Polk, Jr., 1537 Bilco St., Dallas, TX (US) 75232

( * ) Notice: Subject to any disclaimer, the term of this patent is extended or adjusted under 35 U.S.C. 154(b) by 0 days.

(21) Appl. No.: 10/104,174

(22) Filed: Mar. 22, 2002

(65) Prior Publication Data

US 2002/0133963 A1 Sep. 26, 2002

Related U.S. Application Data

(60) Provisional application No. 60/277,863, filed on Mar. 23, 2001, and provisional application No. 60/286,458, filed on Apr. 27, 2001.

(51) Int. Cl.$^7$ ................................. G01B 5/24
(52) U.S. Cl. ................... 33/562; 33/645; 285/179; 248/49; 138/106
(58) Field of Search .................. 33/613, 645, 562, 33/1 G, 529; 248/49, 56, 65, 68.1, 74.1; 138/106, 108, 118, 118.1; 285/41, 179, 182, 184; 269/910; 52/220.2

(56) References Cited

U.S. PATENT DOCUMENTS

| | | | | |
|---|---|---|---|---|
| 441,836 A | * | 12/1890 | Greenfield | 285/179 |
| 540,584 A | * | 6/1895 | Dieckmann | 285/179 |
| 1,829,054 A | * | 10/1931 | Olley | 285/179 |
| 1,884,036 A | * | 10/1932 | Malone | 248/74.1 |
| 3,456,702 A | * | 7/1969 | Johnson | 33/613 |
| 4,036,289 A | * | 7/1977 | Cheng et al. | 138/106 |
| 4,113,173 A | * | 9/1978 | Lolachi | 494/18 |
| 4,924,646 A | * | 5/1990 | Marquardt | 52/220.1 |
| 5,163,233 A | * | 11/1992 | Benson | 33/613 |
| 5,215,335 A | * | 6/1993 | Hamm, Jr. | 285/179 |
| 5,370,345 A | * | 12/1994 | Condon | 248/65 |
| 5,399,812 A | * | 3/1995 | Woszczyna et al. | 248/68.1 |
| 5,738,148 A | * | 4/1998 | Coral et al. | 138/118 |
| 5,842,349 A | | 12/1998 | Wakita et al. | |
| 5,992,125 A | * | 11/1999 | Hardy | 52/737.3 |
| 6,176,057 B1 | | 1/2001 | Bouchet et al. | |

OTHER PUBLICATIONS

Marshall Brain, How Air Conditioners Work; http://www.howstuffworks.com/ac.htm/printable.

* cited by examiner

*Primary Examiner*—G. Bradley Bennett
(74) *Attorney, Agent, or Firm*—Jeffrey G. Degenfelder; Carstens Yee & Cahoon LLP

(57) ABSTRACT

A line guide for enabling a single person to complete the installation of refrigeration lines in a pre-built structure. The line guide is adaptable to both wood and metal frame construction. In one embodiment, the line guide has a unitary body comprised of an attachment bracket with a guide tube formed therein. The guide tube's axial orientation changes over its length. The guide tube's change in axial orientation may be fixed or variable. In addition, the guide tube may be detachable from the bracket enabling guide tubes of different fixed orientations to be used in combination with the same bracket. In another embodiment, the line guide is adapted for use in retrofit building applications. A guide tube is positioned through a hole formed in the soffit of the structure thereby allowing access to the overhead space. Annular bracket fittings help secure the guide tube in the soffit hole.

6 Claims, 5 Drawing Sheets

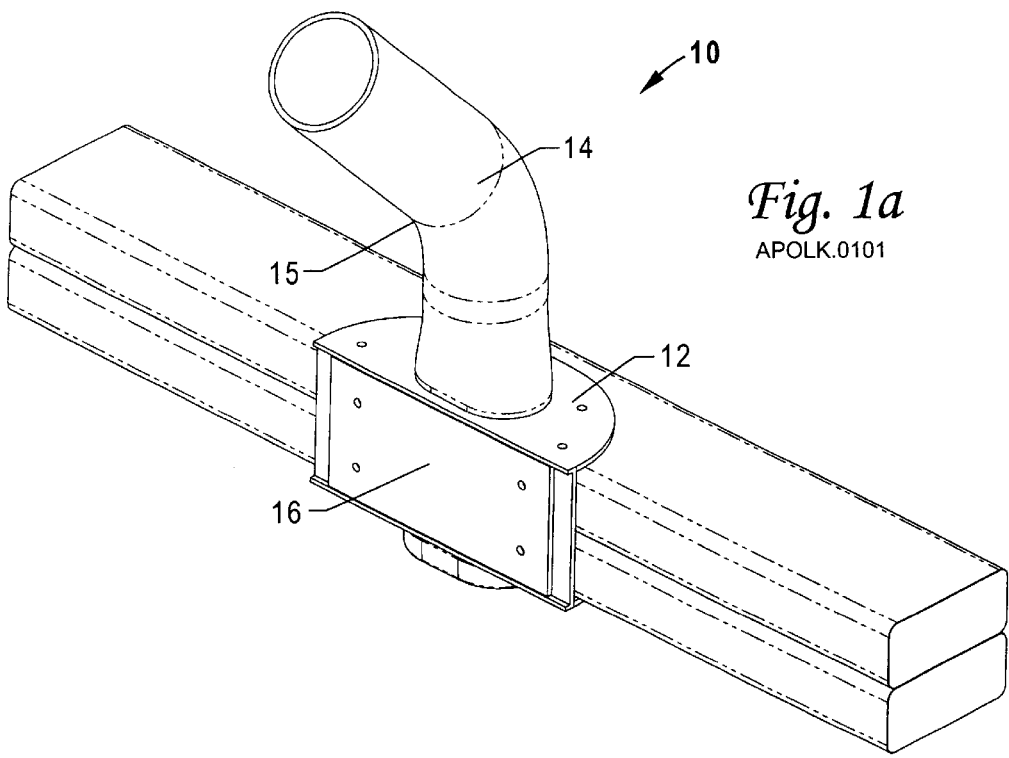
*Fig. 1a*
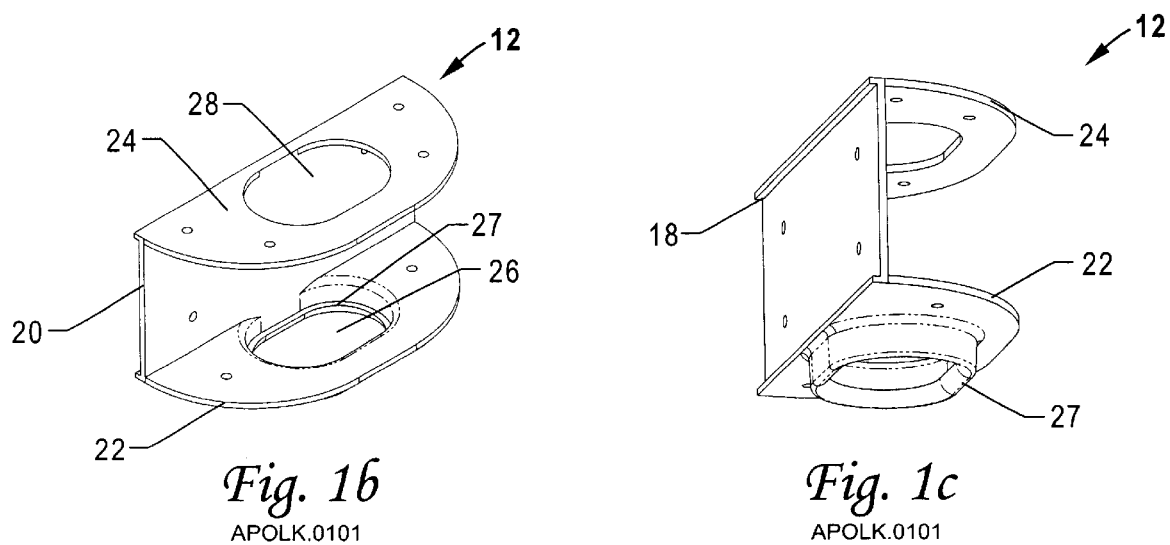
*Fig. 1b*    *Fig. 1c*

APOLK.0101

APOLK.0101

APOLK.0101

APOLK.0101

APOLK.0101

APOLK.0101

APOLK.0101

LINE GUIDE

CROSS-REFERENCE TO RELATED APPLICATIONS

This application claims the benefit of and priority to U.S. Provisional Patent Application No. 60/277,863 filed Mar. 23, 2001 and U.S. Provisional Patent Application No. 60/286,458, filed Apr. 27, 2001, the technical disclosures of both of which are hereby incorporated herein by reference.

BACKGROUND OF THE INVENTION

1. Technical Field

The present invention relates to an apparatus and method for improving the efficiency of installing refrigeration lines. More particularly, the present invention relates to a bracket guide and method for using same which facilitates a more efficient installation of refrigeration lines between a first and second unit.

2. Description of the Related Art

The use of refrigerated air conditioning systems in commercial and residential property has become commonplace and ubiquitous. Indeed, particularly in the South and Southwest, it borders on being a necessity for ordinary life. Over the years, a variety of different air conditioning systems have been developed for cooling interior spaces. For example, in particularly arid regions, evaporative coolers are effective air conditioners, while large commercial buildings oftentimes rely upon air conditioning systems commonly known as chilled-water systems. Perhaps the most widely employed air conditioning system used today is what is commonly termed refrigerated air.

Refrigerated air conditioning systems, commonly found in such diverse products as refrigerators, automobiles, and buildings, all operate in accordance with the same general principals. A refrigerant gas (e.g., Freon) is compressed, causing it to become a hot, high-pressure gas. This hot gas is then directed through a first set of heat exchange coils to dissipate its heat and condense into a liquid. The liquid refrigerant is then directed to an expansion valve wherein it is allowed to evaporate becoming a cold, low pressure gas. This gas is then directed to a second set of heat exchange coils allowing the cold gas to absorb heat and in turn cool down air directed over the second set of coils. The refrigerant gas is then cycled back to the compressor to repeat the process once more.

While all refrigerated air conditioning systems operate in accordance with the same general principals, there are a multitude of specific systems adapted to particular uses. With regard to residential and smaller commercial building applications, one system in particular, commonly known as a "split-system," has become quite prevalent. As its name implies, split-system air conditioners split the "hot" side from the "cold" side of the refrigerated cycle system. The hot side of the system, known as the condensing unit, is placed outside the building and comprises a compressor, heat exchange coil and a fan to disperse the heat generated by the system. The cold side of the system, comprising an expansion valve and evaporator coil, is generally placed in a furnace or some other air circulating device. The air circulating device blows air over the evaporator coil and routes the air throughout the building using a series of ducts.

Because the two components of a split-system air conditioner are remotely located from one another, connecting lines are used to link the two components together. These connecting lines, or refrigeration lines as they are commonly referred to, usually comprise a supply line, a return line, and a voltage control wire. The supply and return lines typically comprise copper tubing and one or both may include a wrapping of insulation (e.g., foam tubing).

Several problems arise during the installation of these refrigeration lines. The refrigeration lines must be laid between an exterior location and an interior location, thereby connecting the condenser unit with the evaporator coil. Consequently, this requires routing the refrigeration lines through an exterior wall and up into an attic or overhead space where the furnace or other air circulating device is located. Typically, the installation of refrigeration lines comprises forming an access hole in an exterior wall whereby the refrigeration lines can be fed through. Another hole or notch is formed in the vertical top plate allowing access to the overhead space. Special care must be taken when installing the refrigeration lines to ensure they are not damaged during the installation process. While flexible and durable, the copper tubing is prone to crimping. The wrapping of insulation and voltage control wire are also prone to tearing and chaffing. Thus, currently, the installation process usually requires two installers to complete in a satisfactory manner. Typically, one installer, positioned on the ground floor, feeds and routes and the refrigeration line up and through the hole formed in the to another installer located in the overhead space. The installer in the overhead space must carefully bend the refrigeration lines to avoid hitting the pitched roofline. Particular care must be taken throughout the installation process to ensure that the tubing does not crimp and that the insulation or wiring is not torn.

While inherently difficult in new construction where the space between walls is usually accessible, the installation of refrigeration lines is further compounded in retrofit applications to existing housing where the space between walls is usually not easily accessible.

A need, therefore, exists for an improved method and device for installing refrigeration lines which would require only one installer. Further, a need exists for a method and device for improving the efficiency of installing refrigeration lines which is highly adaptable to a variety of building applications. Still further, a need exists for a method and device for improving the efficiency of retrofit installations of refrigeration lines in existing buildings.

SUMMARY OF THE INVENTION

The present invention overcomes many of the disadvantages of prior art refrigeration line installation techniques by providing a line guide which when properly mounted in the horizontal top plate of a structure enables one person to properly install refrigeration lines. The line guide is adaptable to both wood and metal frame construction.

In one embodiment, the line guide has a unitary body comprised of an attachment bracket with a guide tube formed therethrough. The guide tube's axial orientation changes over its length. The guide tube's change in axial orientation may be fixed or variable. In addition, the guide tube may be detachable from the bracket enabling guide tubes of different fixed orientations to be used in combination with the same bracket.

In another embodiment, the line guide is adapted to soffit installations for use in retrofit applications. A guide tube is positioned through a hole formed in the soffit of the structure thereby allowing access to the overhead space. Annular bracket fittings help secure the guide tube in the soffit hole.

BRIEF DESCRIPTION OF THE DRAWINGS

A more complete understanding of the method and apparatus of the present invention may be had by reference to the following detailed description when taken in conjunction with the accompanying drawings, wherein:

FIG. 1a is a perspective view of an embodiment of the present invention.

FIG. 1b is an perspective view of a attachment bracket in an embodiment of the line guide of the present invention;

FIG. 1c is a reverse perspective view of the attachment bracket in an embodiment of the line guide of the present invention;

Figure 2:
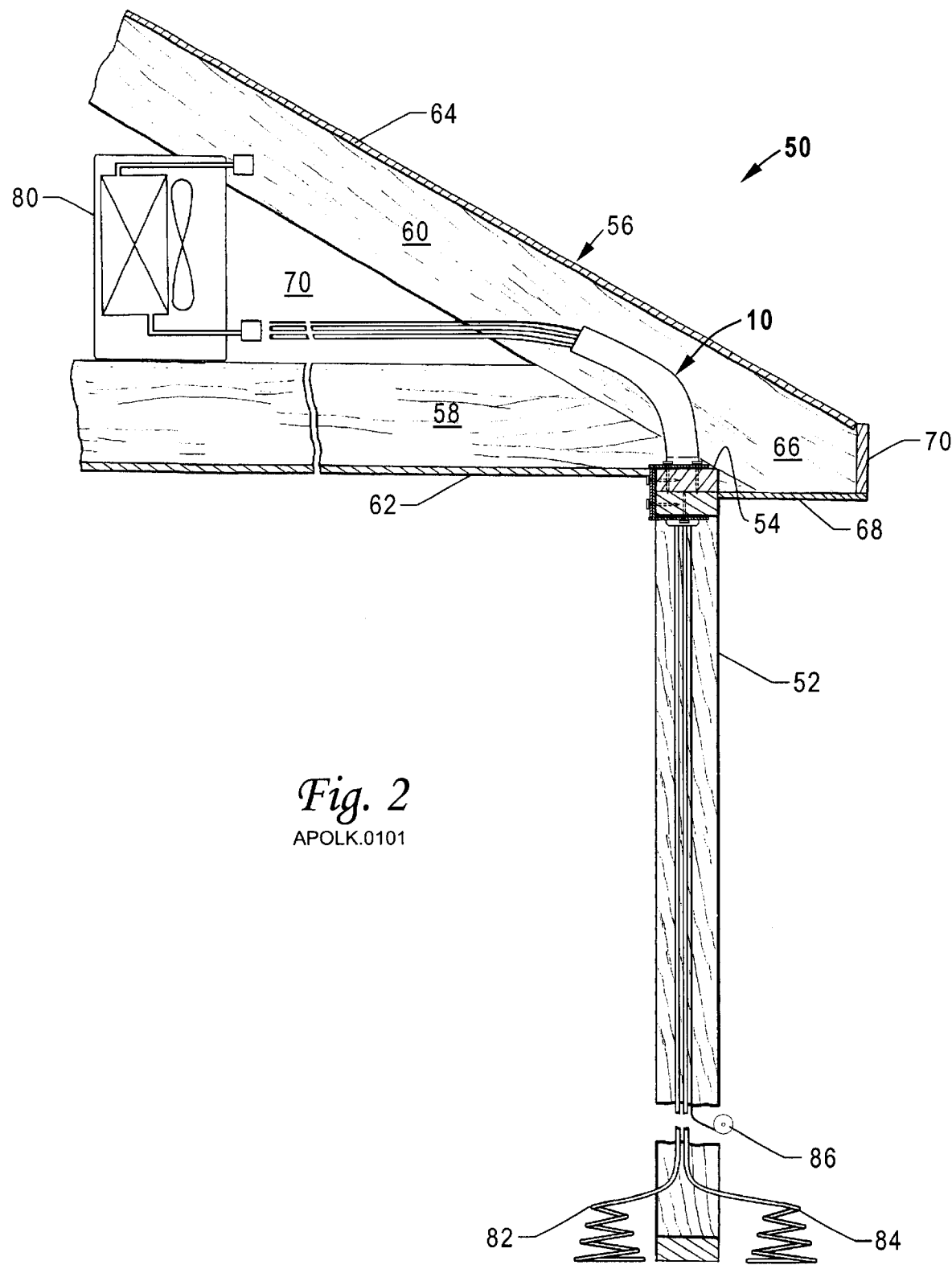
FIG. 2 is a cross-sectional view of a typical frame construction structure illustrating a horizontal top plate installation of an embodiment of the line guide of the present invention.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DETAILED DESCRIPTION OF THE INVENTION

With reference to FIG. 1a, a perspective view of an embodiment of the line guide 10 of the present invention is shown. The line guide 10 may be constructed either as a unitary piece or as a composite piece comprised of two or more interlocking pieces. The line guide includes a bracket element 12 and a guide tube 14.

The bracket element 12 is used to attach the line guide 10 to a horizontal top plate. As shown in FIGS. 1b and 1c, the bracket element 12 includes a vertical side 20 bounded by two opposing horizontal pieces 22, 24 with apertures 26, 28 formed respectfully therein, and suitable for grasping and aligning the guide tube 14. In the embodiment shown, the bottom horizontal piece 22 also includes a flange recess 22 formed around aperture 26 wherein one end of the guide tube 14 may be inserted and secured. The bracket element 12 also includes a groove 18 formed in the outer surface of vertical side 20 and suitable for holding a nailing plate 16 which facilitates the installation of the bracket element 12. The nailing plate 16 may be a separate metal strip or a reinforced area comprised of thicker material. The bracket element 12 may also include pre-formed nail holes or other associated means for facilitating the installation of the bracket element 12.

The guide tube 14 is comprised of a length of tubing with a sufficient inner diameter to allow the refrigeration lines to easily move within its confines. The interior surface of guide tube 14 is generally smooth and may, in addition, be coated with a friction reducing compound. The outer diameter of the guide tube 14 is adapted to fit the apertures 26 and 28, formed in the bracket element. The guide tube 14 also includes a bend 15 that smoothly changes the axial orientation of the guide tube 14.

Referring now to FIG. 2, the present invention is intended for use in the buildings of the type having conventional upstanding walls, such as the one shown at 50, which includes vertical studs 52 connected by a horizontal top plate 54. A roof 56 for the building is made up of roof framing members which include horizontal ceiling joists 58 and roof rafters 60 which incline upwardly from the ceiling joists 58. Ceiling means 62 (e.g. dry wall or plywood) is fixed to the underside of the joists 58, while roof sheathing 64 is fixed to the top side of rafters 60. The wall board 62 and roof sheathing 64 define an attic or upper space 70 for the building.

The ceiling joists 58 and roof rafters 60 come together and are secured in the area of the wall top plate 54. The roof rafters 60 extend beyond the wall top plate 54 and form eaves, such as the one shown at 66. As is conventional, the eave 66 is hollow and is covered along the bottom by sheathing which forms the soffit 68 and along its side by a fascia board 72 that is oriented perpendicular to the soffit 68.

The attic or upper space 70 and the hollow eaves 66 are connected by openings defined between the roof framing members, and specifically between adjacent pairs of ceiling joists 58 and roof rafters 60, the wall top plate 54 and the roof sheathing 64.

As shown in FIG. 2, the indoor unit 80 of a split-system air conditioner (i.e., the evaporator coil and expansion valve) is commonly placed in the attic or upper space 70 of a building. As previously mentioned, the condensing unit (not shown), is usually placed on the exterior of the building. In order to connect the two systems in the conventional manner, a line guide 10 of the present invention is installed in the horizontal top plate 54 thereby allowing the attic or upper space 70 of the building to be more easily accessed from below.

The line guide 10 is installed by cutting a suitably sized notch in the horizontal top plate 54 and securing the line guide 10 into the notch such that the inner surface of the vertical side 20 of the bracket element 12 is generally adjacent to and parallel with the vertical sides of the horizontal top plate 54 and the opposing horizontal pieces 22 and 24 of the bracket element 12 are disposed on the bottom and top horizontal surfaces of the horizontal top plate 54. The line guide 10 is thereupon securely fastened to the horizontal top plate 54 using any suitable fastening means (e.g., nails, screws, rivets, or adhesives).

In the embodiment shown in FIG. 2, the guide tube 14 of line guide 10 includes a preformed bend which smoothly changes the axial orientation of the guide tube 14 from generally vertical at its lower end to an orientation which is generally parallel to the incline of the roof 56.

Once installed in the manner illustrated in FIG. 2, the line guide 10 enables a single installer to complete the installation of the refrigeration lines. In the typical installation, an installer will bundle the refrigeration lines (i.e., the supply and return line 82, 84 and the voltage control wire 86) into a single combined line. The installer then threads the combined refrigeration lines up and through the guide tube 14 of line guide 10 and into the attic or upper space 70. The smooth change in the axial orientation of the guide tube 14 gently redirects the angular orientation of the refrigeration lines such that the lines are gently bent without crimping. Additionally, the smooth interior surface of guide tube 14 prevents the insulation layer on any of the refrigeration lines from chaffing being torn. Once a sufficient length of refrigeration line has been pushed up into the attic or upper space 70 to generally hold the refrigeration line in place, the installer may reposition to the attic or upper space 70 where the combined refrigeration line may be pulled the rest of the length.

Figure 3A:
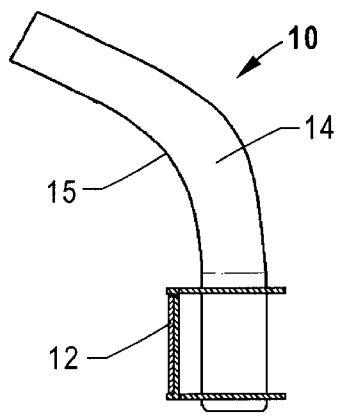
FIGS. 3a, 3b, and 3c are side views of alternate variations of an embodiment of the line guide of the present invention.
Figure 3B:
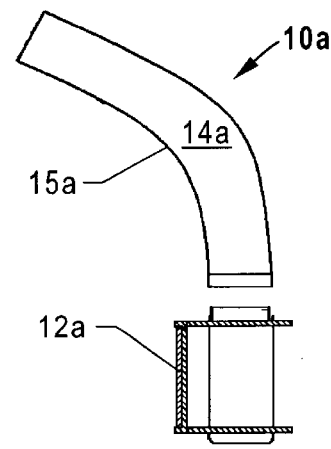
Figure 3C:
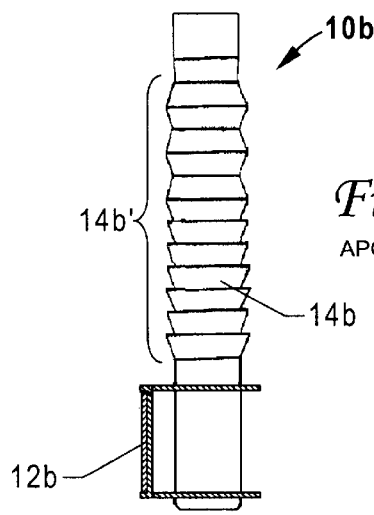

Referring now to FIGS. 3a, 3b, and 3c, alternate variants of the embodiment of the line guide 10 are illustrated. FIG. 3a illustrates a line guide 10 which has a unitary body comprised of an attachment bracket 12 with a guide tube 14 formed therein. The guide tube 14 includes a fixed preformed bend 15 which smoothly changes the axial orientation of the guide tube 14 over its length. It is understood that numerous variations of this variant of the embodiment of line guide 10 may be constructed, each with a distinct and fixed preformed bend 15.

FIG. 3b illustrates a line guide 10a comprised of an attachment bracket 12a and a detachable guide tube section 14a. The guide tube section 14a includes a fixed preformed bend 15a which smoothly changes the axial orientation of the guide tube 14a over its length. However, because the guide tube section 14a is detachable, a variety of guide tube sections with distinct and fixed preformed bends 15a can be used in combination with the same attachment bracket 12a. The guide tube section 14a may be affixed to the attachments bracket 12a by any suitable conventional means (e.g., friction fitting, adhesive gluing, opposing screw threads, rivets or screws).

FIG. 3c illustrates a line guide 10b which may have either a unitary or composite body comprised of an attachment bracket 12b and a guide tube 14b. The guide tube 14b of this variant includes a pull-out flexible convoluted section 14b' similar in principle to those found in conventional flexible drinking straws. The convoluted section 14b' may adjusted as necessary to obtain the desired change in axial orientation over its length. While, perhaps, not as rigid as the variants comprising preformed bends in the guide tube, the convoluted section 14b' allows the guide tube 14b the flexibility to be formed into an infinite number of changes in axial orientation over its length. As mentioned previously, the utility of the pull-out flexible convoluted section 14b' illustrated in FIG. 3c may be combined with the utility of the variant illustrated in FIG. 3b. Thus, a further variation of the a line guide 10a illustrated in FIG. 3b may further comprise a pull-out flexible convoluted section 14b' formed in the detachable guide tube section 14a.

Figure 4:
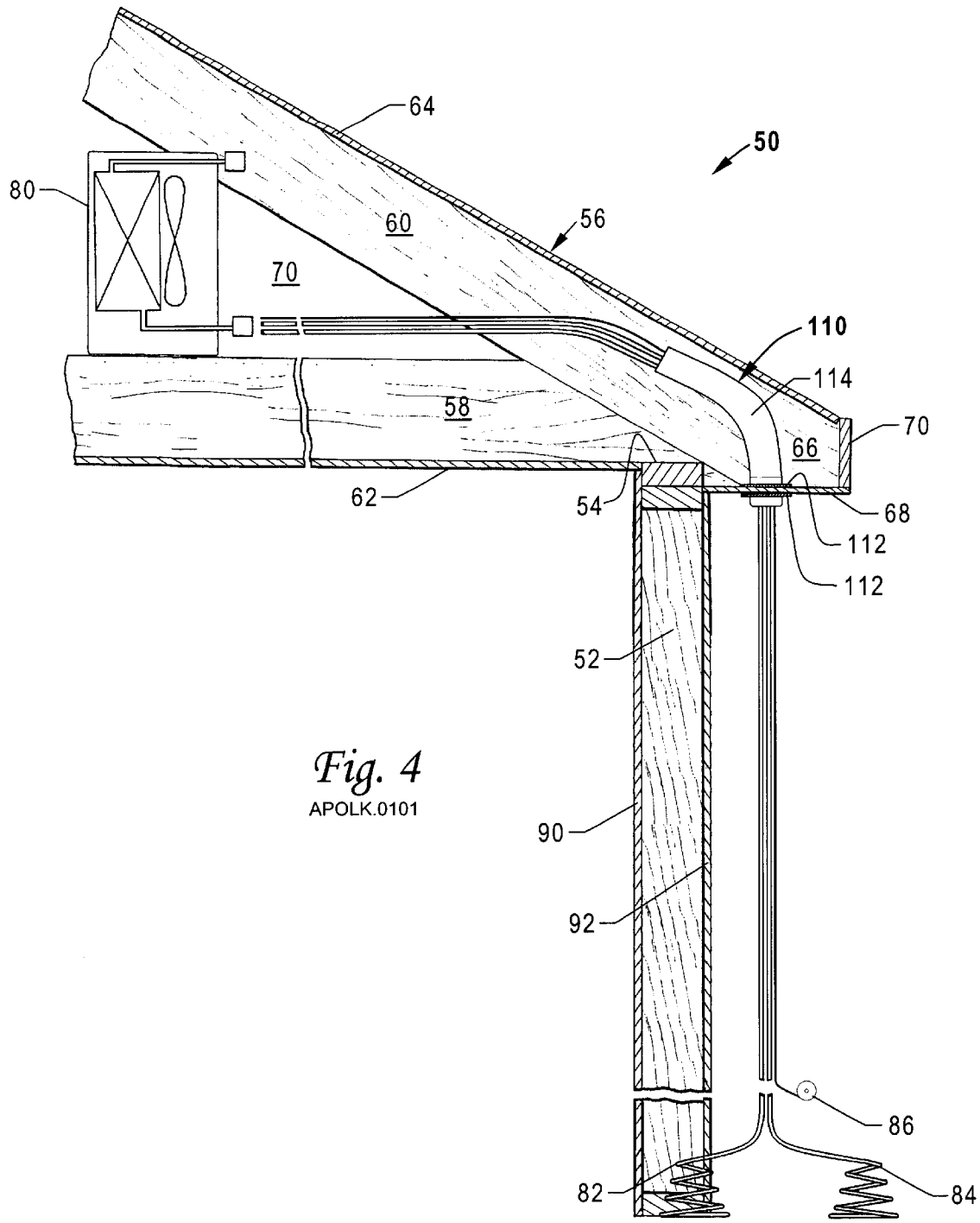
FIG. 4 is a cross-sectional view of a typical frame construction structure illustrating a soffit installation of an embodiment of the line guide of the present invention.

Referring now to FIG. 4, an alternate embodiment of the line guide 110 is illustrated which is adapted for use in retrofit applications. This embodiment of the present invention is also intended for use in buildings of the type having conventional upstanding walls as described previously and illustrated in FIG. 2. However, in retrofit applications, the problems associated with installing refrigeration lines are further compounded by the restricted access to interior wall spaces. Typically, interior walls 90 and exterior walls 92 prevent easy access to interior wall spaces. Thus, the installation of refrigeration lines through the horizontal top plate 54, as discussed previously, is oftentimes not practicable in retrofit applications.

Figure 5A:
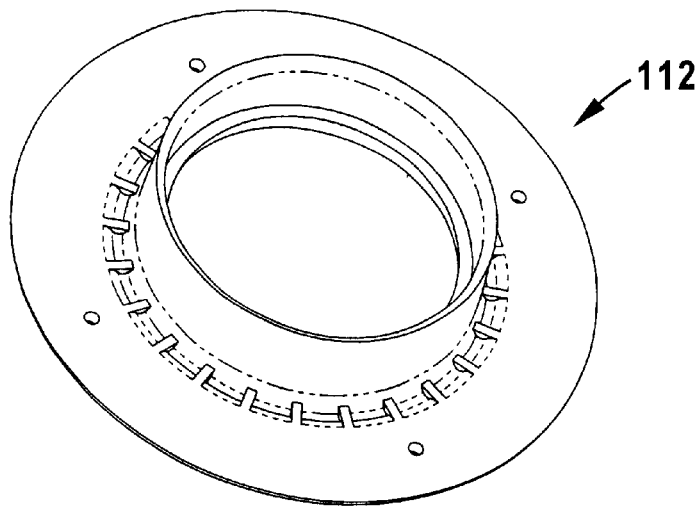
FIG. 5a is an perspective view of an embodiment of the annular bracket fitting used in soffit installations of the line guide of the present invention.
Figure 5B:
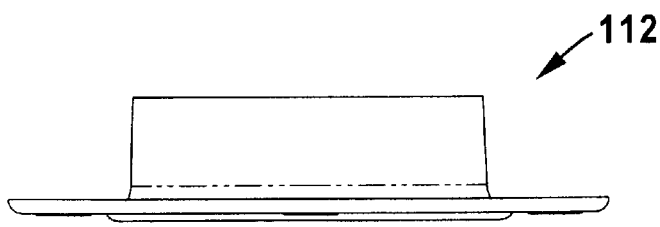
FIG. 5b is an side view of an embodiment of the annular bracket fitting used in soffit installations of the line guide of the present invention.

The alternate embodiment of the line guide 110 comprises a guide tube 114 and two annular bracket fittings 112. The guide tube 114 is similar in every respect to the guide tube 14 of the previously discussed embodiment of the line guide 10. As shown in one embodiment illustrated in FIGS. 5a and 5b, the annular bracket fittings 112 are designed to fit snugly over one end of the guide tube and hold the guide tube securely in place.

The alternate embodiment of the line guide 110 is installed by cutting a suitably sized hole in the soffit 168 and positioning the guide tube 114 in the hole such that the exit end of the guide tube is able access the attic or overhead space 70 via the hollow eave 66. The two annular bracket fittings 112 are coaxially positioned on the guide tube 114, one on the exterior of the soffit 168 and one on the interior of the soffit 168. The annular bracket fittings 112, and consequently the line guide 110, are thereupon securely fastened to soffit 168 using any suitable fastening means (e.g., compression fittings, opposing screw threads, screws, nails, rivets, or adhesives).

Once installed in the manner illustrated in FIG. 4, the line guide 110 also enables a single installer to complete the installation of the refrigeration lines in a manner similar to that specified previously. It is also understood that all of the alternate variants of the embodiment of the line guide 10 disclosed previously, and illustrated in FIGS. 3a, 3b, and 3c, are also applicable to the alternate embodiment of the line guide 110.

It is further understood that the present invention may be formed out of any suitable thermoplastic or composite material. Indeed, certain Ultra High Molecular Weight (UHMW) plastic materials with self-lubricating properties might be particularly suited to certain applications.

It will now be evident to those skilled in the art that there has been described herein an improved apparatus and method for improving the efficiency of installing refrigeration lines. Although the invention hereof has been described by way of a preferred embodiment, it will be evident that other adaptations and modifications can be employed without departing from the spirit and scope thereof. For example, while the illustrations depict a single story building, the principals discussed with respect to the use and employment of the present invention are equally applicable to multistoried buildings. Similarly, while the illustrations depict the condensing unit being located below the evaporator coil, it is understood that, especially in light commercial applications, the condensing unit may be positioned above the evaporator coil (e.g., on the roof of the building). The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A guide for aiding in the installation of refrigeration lines through a partition, comprising in combination:

an attachment bracket having a planar surface bounded on a first edge by a first planar side piece and bounded on a second edge by a second planar side piece, said side pieces each having an aperture formed therethrough and being generally parallel to one another and extending generally perpendicularly from a face of said planar surface, wherein said first side piece is positioned adjacent to a first side of said partition and said second side piece positioned adjacent to a second side of said partition; and a guide tube having opposite distal ends defining a passageway therethrough and an axial orientation which changes over its length, wherein a segment length of said guide tube is positioned between the apertures formed in said first and second planar pieces so that a first distal end of said guide tube is on said first side of said partition and a second distal end of said guide tube is on said second side of said partition.

2. The device of claim 1 wherein said guide tube is detachable from said attachment bracket.

3. The device of claim 1 wherein a portion of said guide tube is detachable from said attachment bracket.

4. The device of claim 1 wherein a portion of said guide tube is flexible.

5. The device of claim 1 wherein said guide tube is rigid.

6. The device of claim 1 wherein said guide tube is flexible.

* * * * *